United States Patent Office 2,952,682
Patented Sept. 13, 1960

2,952,682

POLYCYCLIC COMPOUNDS AND PROCESS OF PREPARING SAME

Georges Muller, Nogent-sur-Marne, Gérard Nominé, Noisy le Sec, and Julien Warnant, Neuilly-sur-Seine, France, assignors to Les Laboratoires Francais de Chimiotherapie, Paris, France, a corporation of France No Drawing. Filed Oct. 29, 1957, Ser. No. 693,028

Claims priority, application France Oct. 31, 1956

5 Claims. (Cl. 260—287)

The present invention relates to a new and improved process of synthetically producing reserpine and more particularly to a process of synthetically producing reserpine and new valuable intermediates isolated in the course of said process, and to such new and valuable intermediate products.

Reserpine which corresponds to the following Formula A

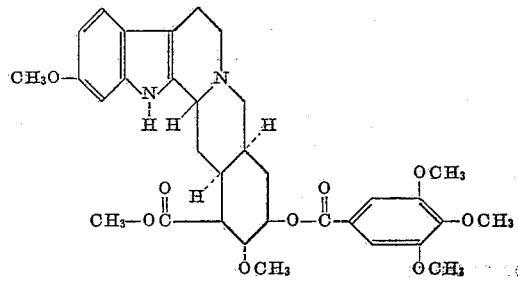

is one of the principal constituents of the chalchypines isolated from *Rauwolfia heterophylla* Roem. et Schult. It has been described for the first time by R. Paris and R. Mendoza-Daza, "Bulletin des Sciences pharmacologiques," volume 48, page 146 (1941); by R. Mendoza-Daza doctor's thesis of the university (Faculté de Pharmacie, Université de Paris) Paris 1940; C. Djerassi, M. Gorman, A. L. Nussbaum, J. Reynoso "Journ. Am. Chem Soc.," vol. 75, page 5446 (1953); vol. 76, page 4463 (1954). Reserpine has been isolated in crystalline form by J. M. Muller, E. Schlittler, and H. J. Bein as described in "Experientia," vol. 8, page 338 (1952). Muller et al. used as starting material the so-called "oleoresins" of *Rauwolfia serpentina* Benth.

Reserpine has a sedative and a progressively increasing and prolonged hypotensive action. It has also a body temperature reducing effect and increases intestinal peristalsis. Such properties have made reserpine an adjuvant of the first order in modern therapy and particularly a highly active psychosomatic agent of low toxicity.

It is one object of the present invention to provide a simple and economic synthetic process of preparing reserpine.

Another object of the present invention is to provide suitable starting materials for the synthesis of reserpine.

Still another object of the present invention is to provide a simple and effective process of producing such new and valuable starting materials for the synthesis of reserpine.

Other objects of the present invention and advantageous features thereof will become apparent as the description proceeds.

In principle the present invention consists in using the enantiomorphous dextrorotatory isomer of 5β-hydroxy-8 - oxo - 1,4,4aα,5,8,8aα - hexahydronaphthalene - 1β-carboxylic acid of Formula I

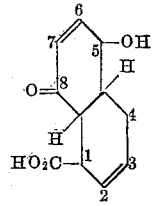

Said isomer has not been described heretofore.

The synthetic process of preparing reserpine from said starting material of Formula I according to the present invention makes use of the following derivatives of said acid which also have not been described heretofore:

The levorotatory lactone of 5β-hydroxy-8-oxo-1,4,4aα, 5,8,8aα-hexahydronaphthalene-1β-carboxylic acid of Formula II:

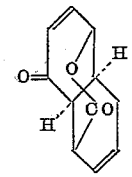

The dextrorotatory lactone of 8β-hydroxy-2α-bromo-3β,5β - epoxy - 1,2,3,4,4aα,5,8,8aα - octahydronaphthalene-1β-carboxylic acid of Formula III:

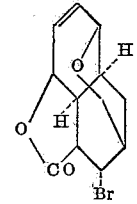

The ozonide of the levorotatory methyl ester of 3β-acetoxy - 2α - methoxy - 7 - oxo - 1,2,3,4,4aα,7,8,8aα - octahydronaphthalene-1β-carboxylic acid of Formula IV:

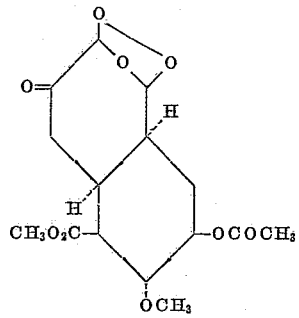

The dextrorotatory 18β-hydroxy-11,17α-dimethoxy-3-oxo-16β-carboxy-2,3-seco-20α-yohimbane of Formula V:

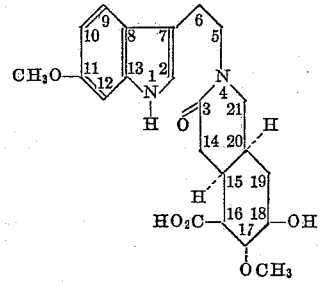

The levorotatory lactone of 18β-hydroxy-11,17α-dimethoxy - 3 - oxo - 16β - carboxy - 2,3 - seco - 20α-yohimbane of Formula VI:

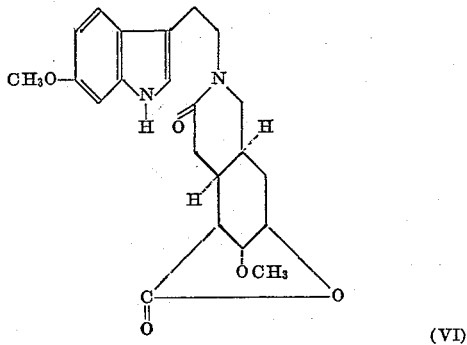

(VI)

The lactone of 18β-hydroxy-11,17α-dimethoxy-16β-carboxy-3,4-dehydro-20α-yohimbane of Formula VII:

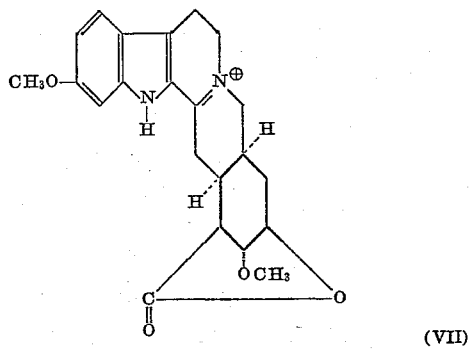

(VII)

The process according to the present invention which starts with the compound of Formula I and proceeds by way of the compounds of Formulas II, III, IV, V, VI and VII, yields as final product the lactone of reserpic acid of Formula VIII:

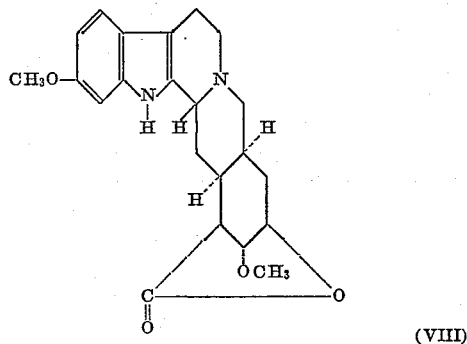

(VIII)

The lactone of reserpic acid is converted into reserpine of Formula A in a manner known per se.

The starting material, the enantiomorphous dextrorotatory 5β-hydroxy-8-oxo-1,4,4aα,5,8,8aα-hexahydronaphthalene-1β-carboxylic acid is obtained by resolving the corresponding racemic mixture.

Resolution of the racemic acid is effected by preparing the salts of the enantiomorphous isomers of said acid with optically active bases such as quinine, brucine, cinchonine, or the levorotatory ephedrine. The optically active salts obtained thereby are isolated and then decomposed to set free the resolved optically active acids.

Thereafter, the resulting dextrorotatory enantiomorphous 5β-hydroxy-8-oxo-1,4,4aα,5,8,8aα-hexahydronaphthalene-1β-carboxylic acid of Formula I is heated under reflux in methylene chloride with a mixture of sodium acetate and acetic acid anhydride. The resulting levorotatory lactone of 5β-hydroxy-8-oxo-1,4,4aα,5,8,8aα-hexahydronaphthalene-1β-carboxylic acid of Formula II is isolated from the reaction mixture and is reduced by means of aluminum isopropylate in isopropanol to the levorotatory 1,8-lactone of 5β,8β-dihydroxy-1,4,4aα,5,8,8aα-hexahydronaphthalene-1β-carboxylic acid which is isolated.

Said lactone is reacted with a calculated amount of an N-bromo imide, such as N-bromo succinimide, of an N-bromo amide, or of an N-bromo hydantoine at about room temperature and in a solvent which is not attacked by bromine. Thereby, the dextrorotatory lactone of 8β-hydroxy - 2α - bromo - 3β,5β - epoxy - 1,2,3,4,4aα,5,8, 8aα-octahydronaphthalene-1β-carboxylic acid of Formula III is obtained which is isolated by precipitation with water.

Said lactone of Formula III is treated with sodium methylate in methanol so as to convert it into the dextrorotatory lactone of 8β-hydroxy-2α-methoxy-3β,5β-epoxy-1,2,3,4,4aα,5,8,8aα - octahydronaphthalene - 1β - carboxylic acid which is isolated and subjected to the action of N-bromo succinimide in dilute sulfuric acid. The resulting levorotatory 1,8-lactone of 6α-bromo-7β,8β-dihydroxy - 2α - methoxy - 3β,5β - epoxy - 4aα,8aα - decahydronaphthalene-1β-carboxylic acid is separated from the reaction mixture and is oxidized by means of chromic acid in acetic acid to the levorotatory lactone of 6α-bromo-8β - hydroxy - 2α - methoxy - 3β,5β - epoxy - 7 - oxo - 4aα,8aα-decahydronaphthalene-1β-carboxylic acid.

The isolated lactone is treated with zinc powder in acetone and acetic acid in order to produce the levorotatory 3β - hydroxy - 2α - methoxy - 7 - oxo - 1,2,3,4,4aα,7,8, 8aα-octahydronaphthalene-1β-carboxylic acid. The methyl ester of said acid is prepared by reacting the acid with diazomethane in dioxane. The methyl ester is then acetylated by means of acetic acid anhydride in pyridine in order to isolate the levorotatory methyl ester of 3β-acetoxy - 2α - methoxy - 7 - oxo - 1,2,3,4,4aα,7,8,8aα - octahydronaphthalene-1β-carboxylic acid. Ozone is then reacted with said levorotatory methyl ester in an organic solvent such as acetic acid ethyl ester or methylene chloride at temperatures between 0° C. and −60° C.

The resulting ozonide of Formula IV is converted in 1β-carboxy methyl-2β-methoxy carbonyl-3α-methoxy-4β-acetoxy-6β-formyl cyclohexane. This conversion is effected by oxidation of the hydrate of 1β-(2',3'-dioxopropyl) - 2β - methoxy carbonyl - 3α - methoxy-4β - acetoxy - 6β-formyl cyclohexane by means of chromic acid or periodic acid. Said compound is obtained by the action of zinc powder on the ozonide of Formula IV in the presence of acetic acid. 1β-carboxymethyl 2β-methoxycarbonyl 3α-methoxy 4β-acetoxy 6β-formylcyclohexane is more directly obtained by the action of water or of iodic acid or periodic acid on said ozonide. The resulting levorotatory 1β-carboxy methyl-2β-methoxy carbonyl-3α-methoxy-4β-acetoxy-6β-formyl cyclohexane is converted into the methyl ester by means of diazomethane in a mixture of methylene chloride and ether.

Its methyl ester is then condensed with 6-methoxy tryptamine which, after a treatment with sodium borohydride and thereafter with alcoholic sodium hydroxide solution, yields the dextrorotatory 18β-hydroxy-11,17α-dimethoxy-3-oxo-16β-carboxy-2,3-seco-20α-yohimbane of Formula V. Said compound is converted into the corresponding lactone of Formula VI. Ring closure of said lactone to the lactone of 18β-hydroxy-11,17α-dimethoxy-16β-carboxy-3,4-dehydro-20α-yohimbane of Formula VII is achieved by reaction with phosphorus oxychloride while heating.

Said lactone of Formula VII is reduced by means of zinc powder in the presence of acetic acid to the lactone of reserpic acid or by the action of a double hydride to the lactone of isoreserpic acid which according to processes known to the art is isomerized to the lactone of reserpic acid of Formula VIII.

Reserpic acid lactone is then converted according to known methods into the methyl ester of reserpic acid and said methyl ester is subjected to the action of 3,4,5-trimethoxy benzoylchloride, thereby yielding reserpine.

The process according to the present invention is of great interest to the art for the following reasons:

A. It is well known that heretofore used methods for the total synthesis of reserpine effect resolution only at that stage of the synthetic process where a methyl ester of O-acetyl isoreserpic acid is formed, i.e., approximately after the 20th reaction step of said synthesis. This manner of proceeding is obviously very burdensome; for, all the reactants used and all the costs involved in the preparation of said racemic methyl ester of O-acetyl isoreserpic acid must be applied to the levorotatory methyl ester of O-acetyl reserpic acid obtained at this stage. In contrast thereto, the process according to the present invention effects resolution of the racemic compound at the second stage of the synthetic process. It is evident that such a process is much more economical because theoretically only half the amount of reactants and only half the expenses are required in order to produce the levorotatory methyl ester of O-acetyl isoreserpic acid. The advantages achieved thereby are even more startling when taking into account the following additional advantages due to the new process:

(1) The levorotatory lactone of 5β-hydroxy-8-oxo-1,4,4aα,5,8,8α-hexahydronaphthalene-1β-carboxylic acid of Formula II shows an extraordinarily high rotatory power of −790° (concentration: 0.5% in ethanol). Such a high value permits a very effective control of the progress of purification of said intermediate compound. Said compound, thus, can be obtained in an exceedingly high purity. As a result thereof, purification of the following intermediate products is considerably facilitated and the final yield is greatly increased.

(2) The lactone of 6α-bromo-8β-hydroxy-2α-methoxy-3β,5β-epoxy - 7 - oxo-4aα,8α-decahydronaphthalene-1β-carboxylic acid is very soluble in a mixture of acetone and acetic acid wherein it is reduced by the addition of zinc powder. The solubility in said solvent mixture renders the reduction step operable even on a large scale. In contrast thereto the very low solubility of the corresponding racemic compound renders impossible any technical operation because large volumes of solvents had to be processed. In addition thereto, the yields are not uniform.

(3) The solubility of the levorotatory methyl ester of 3β-acetoxy-2α-methoxy-7-oxo-1,2,3,4,4aα,7,8,8aα-octahydronaphthalene-1β-carboxylic acid is also much higher than that of the racemic compound. Therefore, its oxidation by means of ozone can be carried out more readily and effectively.

(4) The levorotatory 1β-carboxy methyl-2β-methoxy carbonyl-3α-methoxy-4β-acetoxy-6β-formyl cyclohexane crystallizes spontaneously and, thus, permits strict control of its preparation. In contrast thereto, the corresponding racemic compound is amorphous and, consequently, it is rather difficult to determine when the compound is sufficiently pure for further processing.

A particular advantage of the process according to the present invention, thus, is to be seen in the fact that it generally permits to more readily control the reaction and to more easily produce the intermediate compounds required in the course of the synthetic process described hereinabove. Furthermore, purification of said intermediate compounds is facilitated. The rotatory powers of the optically active compounds represent very exact values and, together with the melting points of said compounds, permit easy and exact characterization of said compounds.

B. The conversion of the levorotatory 1,8-lactone of 5β,8β - dihydroxy-1,4,4aα,5,8,8aα-hexahydronaphthalene-1β-carboxylic acid into the dextrorotatory lactone of 8β-hydroxy - 2α - methoxy-3β,5β-epoxy-1,2,3,4,4aα,5,8,8aα-octahydronaphthalene-1β-carboxylic acid, i.e., the conversion of the hydroxy lactone into the corresponding methoxy lactone is effected by way of the dextrorotatory lactone of 8β-hydroxy-2α-bromo-3β,5β-epoxy-1,2,3,4,4aα,5,8,8aα-octahydronaphthalene-1β-carboxylic acid of Formula III. According to Woodward (J. Am. Chem. Soc., vol. 78 [1956] page 2657), the hydroxy lactone is converted into the methoxy lactone by a treatment with bromine in methanol followed by a treatment with sodium methylate whereby the brominated intermediate compound is not isolated. The yield according to Woodward is rather low and does not exceed about 40%. In contrast thereto, the process according to the present invention allows to produce the bromo lactone of Formula III which has not been described heretofore, in a yield of about 90%. Said new bromo lactone of Formula III is of considerable importance; for, it can be converted into the corresponding methoxy lactone with a yield exceeding 90%. The methoxy lactone, thus, becomes readily available on a large scale by using the bromo lactone III as intermediate starting material.

C. Conversion of the methyl ester of 3β-acetoxy-2α-methoxy - 7 - oxo-1,2,3,4,4aα,7,8,8aα-octahydronaphthalene-1β-carboxylic acid into 1β-carboxy methyl-2β-methoxy carbonyl-3α-methoxy-4β-acetoxy-6β-formyl cyclohexane proceeds by way of the ozonide. This process is preferred over the process whereby osmium tetroxide is used. Osmium tetroxide is not only a rather expensive reagent but it is also difficult to handle in view of its high toxicity and volatility. Furthermore, its recovery from the reaction mixture is very difficult. Another considerable advantage of the process according to the present invention consists in the feature that, besides ozone, no other reagent is required for producing 1β-carboxy methyl-2β-methoxy carbonyl-3α-methoxy-4β-acetoxy-6β-formyl cyclohexane, since the decomposition of the ozonide by means of water yields directly the desired aldehyde.

D. Lactonization of the dextrorotatory 18β-acetoxy-11,17α-dimethoxy-3-oxo - 16β - methoxy carbonyl - 2,3-seco-20α-yohimbane by the process according to the present invention avoids the use of expensive reagents and, in addition thereto, permits to omit several reaction steps which were required heretofore. The synthetic method described by Woodward (J. Am. Chem. Soc., vol 78 [1956] pages 2023–2657), does not yield directly 18β-acetoxy - 11,17α - dimethoxy-3 - oxo - 16β - methoxy carbonyl-2,3-seco-20α-yohimbane in its racemic form after cyclization in alkaline medium because in the course of said reaction incomplete saponification of the acetoxy group and also of the methyl ester group takes place although only to a small extent. As a result thereof, it is necessary, when proceeding according to Woodward, to reconvert the resulting cyclization product into the methoxy compound by a treatment with diazomethane and to reacetylate the reaction product by means of a mixture of pyridine and acetic acid anhydride. In contrast thereto the carboxyl group and the hydroxyl group are protected by lactonization when proceeding according to the present invention. It is evident that two reaction steps are eliminated. Furthermore, lactonization of 18β-hydroxy-11,17α - dimethoxy - 3 - oxo - 16β-carboxy - 2,3 - seco-20α-yohimbane of Formula V is achieved with a much higher yield than that of isoreserpic acid and does not require the use of dicyclohexyl carbodiimide.

The following examples serve to illustrate the present invention without, however, limiting the same thereto. More particularly, the nature of the solvents and reactants used, the order of introducing said reactants into the reaction mixture, the reaction temperature and duration, and the like may be varied in accordance with the principles set forth herein and in the claims annexed hereto. In said examples the yield is calculated without taking into consideration the mother liquors which still contain a considerable amount of the desired reaction products.

The melting points given in the examples are points

EXAMPLE 1

*Resolution of dl-1β-carboxy - 5β - hydroxy - 8 - keto- 1,4,4aα,5,8,8aα - hexahydronaphthalene by means of quinine and isolation of 1-1β-carboxy-5β-hydroxy-8-keto - 1,4,4aα,5,8,8aα - hexahydronaphthalene (Formula I)*

104 g. of dl-1β-carboxy-5β-hydroxy - 8-keto - 1,4,4aα, 5,8,8,aα - hexahydronaphthalene of Formula I, prepared as described by Woodward et al. in "Journ. Am. Chem. Soc.," vol 78, page 2023 (1956), are heated under reflux in 400 cc. of ethanol until complete solution is achieved. 162 g. of quinine free of water of crystallization is added at once to the boiling liquid. The salt of quinine with the levorotatory enantiomorphous compound crystallizes soon thereafter. Boiling without agitation is continued for 15 minutes. The mixture is then placed in ice for two hours and the crystals are filtered off. The filtered crystals are twice made into a paste, each time with 100 cc. of ice-cold ethanol. The pasted crystals are again filtered and the salt of quinine with the levorotatory enantiomorphous compound is dried. The yield amounts to 117 g. The melting point is 225° C.; rotatory power $[\alpha]_D^{20} = -151° \pm 4°$.

The resulting product is suspended in 300 cc. of water and 500 cc. of chloroform. 30 g. of sodium bicarbonate are added thereto and the mixture is stirred for three hours until evolution of carbon dioxide ceases. The resulting emulsion is allowed to settle. The chloroform layer is separated from the aqueous layer and is washed several times with a saturated aqueous solution of sodium bicarbonate. The aqueous layer is extracted three times with chloroform in order to remove therefrom the quinine which may be contained therein. The aqueous layer is combined with the bicarbonate wash waters of the chloroform layer and the combined aqueous solutions are acidified by the addition of 5 N hydrochloric acid to a pH of 2.0. The acidified solution is saturated with sodium chloride and is allowed to stand for one hour. The precipitate is filtered and dried in a vacuum above solid sodium hydroxide at 20° C. 33 g. of the levorotatory compound of Formula I are obtained. The melting point is 210° C.; the rotatory power $[\alpha]_D = -78° \pm 4°$. The crude product contains about 3 g. of sodium chloride. On recrystallization from a mixture of equal parts of alcohol and ether the pure levorotatory enantiomorphous compound is obtained. Its melting point is 210° C.; its optical rotation $[\alpha]_D^{20} = -85°$ (concentration: 0.5% in ethanol).

Analysis: $C_{11}H_{12}O_4 = 208.21$. Calculated: 63.45% C, 5.81% H, 30.74% O. Found: 63.3% C, 5.8% H, 30.5% O.

The aqueous mother liquors remaining after removing the crude product are extracted several times with a mixture of chloroform and ethanol (3:1). The combined extracts are washed with salt-containing water until their pH is 4.0. The washed extracts are then dried over magnesium sulfate and evaporated to dryness in a vacuum. A second batch of the levorotatory enantiomorphous compound is recovered showing a rotatory power $$[\alpha]_D = -84°$$

after it has been made into a paste by means of a mixture of chloroform and ethanol (3:1). The yield is 3 g.

The mother liquor from the paste of crystals is also evaporated to dryness and the residue is triturated with chloroform. Thereby a third batch of the crystalline enantiomorphous compound is obtained. The total resolution yield, thus, amounts to 80% of the theoretical yield.

EXAMPLE 2

*Isolation of d-1β-carboxy-5β-hydroxy-8-keto-1,4,4aα,5,8, 8aα-hexahydronaphthalene*

The ethanolic mother liquors obtained according to Example 1 after removing the crystals of the quinine salt of the levorotatory isomer of Formula I are evaporated to dryness. The amorphous residue consists of a mixture of the quinine salt of the dextrorotatory enantiomorphous compound and about 10% of the quinine salt of the levorotatory enantiomorphous compound. Said residue is suspended in a mixture of 300 cc. of water and 500 cc. of chloroform with agitation, as described in Example 1. 30 g. of sodium bicarbonate are added thereto. Decomposition of the quinine salt is completed after about 1 hour. The resulting emulsion is allowed to settle. The chloroform layer is removed and washed twice with an aqueous solution of sodium bicarbonate. The aqueous layer is extracted several times with chloroform in order to completely remove the quinine contained therein. The combined aqueous sodium bicarbonate solutions are acidified by the addition of 5 N hydrochloric acid to a pH of 2.0. The acidified solution is allowed to crystallize. The crystals are filtered off after about 1 hour and are dried. 21 g. of a mixture of the racemic compound of Formula I with a small amount of the dextrorotatory enantiomorphous compound are obtained thereby. The optical rotation of said mixture is $[\alpha]_D^{20} = +22°$ (concentration: 0.5% in ethanol).

The filtrate remaining after filtering off said mixture of racemate and dextrorotatory compound is saturated with sodium chloride and is extracted several times with a mixture of chloroform and ethanol (3:1). The resulting extract in the organic solvent is washed with salt-containing water until its pH is 4.0, dried over magnesium sulfate, and evaporated to dryness in a vacuum. The residue is made into a paste by means of chloroform and yields a first batch of crystals in the amount of 16 g. This product, which represents the pure dextrorotatory enantiomorphous compound of Formula I has a melting point of 210° C. and an optical rotation $$[\alpha]_D^{20} = +83° \pm 4°$$

The mother liquors yield after evaporation and allowing to stand for several days a second batch of crystals.

The mixture of racemic compound and dextrorotatory enantiomorphous compound in the amount of 21 g. (optical rotation $[\alpha]_D^{20} = +22°$) obtained as described hereinabove is dissolved in as small an amount of warm water as possible, usually about 4 parts by volume. The solution is cooled with ice and the precipitate is filtered off. 11 g. of the racemic compound having a melting point of 202° C. are recovered. They are returned to the resolving process.

The mother liquors obtained thereby are saturated with sodium chloride and yield, by proceeding in the same manner as described hereinabove, a further amount of dextrorotatory enantiomorphous compound.

EXAMPLE 3

*Resolution of dl-1β-carboxy-5β-hydroxy-8-keto-1,4,4aα,5, 8,8aα-hexahydronaphthalene by means of brucine*

The procedure is the same as described hereinabove in Examples 1 and 2, whereby, however, 1 mol of brucine is used for 1 mol of the racemic compound. The brucine salt of the levorotatory isomer is obtained in a yield of 88% of the theoretical yield. Its melting point is 210° C., its rotatory power $[\alpha]_D^{20} = -40°$ (concentration: 0.5% in ethanol). Said brucine salt is decomposed as described hereinabove in Example 1 and yields the levorotatory enantiomorphous compound of the rotatory power $[\alpha]_D^{20} = -85°$. The mother liquors of the brucine salt of the levorotatory enantiomorphous compound yield, when treated according to the process described in Example 2, the dextrorotatory enantiomorphous compound.

EXAMPLE 4

*Preparation of the cinchonine salt of the dextrorotatory 1β-carboxy-5β-hydroxy-8 - keto - 1,4,4aα,5,8,8aα - hexahydronaphthalene in water*

1 g. of dl-1β-carboxy-5β-hydroxy-8-keto-1,4,4aα,5,8,8aα-hexahydronaphthalene is dissolved in 10 cc. of water of a temperature of 95° C. 1.4 g. of cinchonine are added to said solution. The mixture is stirred at 90° C. for 5 minutes and is cooled with ice. The precipitated crystals are filtered off, washed with water and dried in a drying oven at 80° C. 940 mg. of the cinchonine salt of the dextrorotatory 1β-carboxy-5β-hydroxy-8-keto-1,4,4aα,5,8,8aα-hexahydronaphthalene are obtained thereby. The yield is 78% of the theoretical yield. The compound which heretofore has not been described is obtained in the form of fine, colorless platelets. The melting point is about 192° C., its optical rotation $[\alpha]_D^{20} = +146° \pm 6°$ (concentration: 0.5% in ethanol). The salt is soluble in ethanol, methanol, acetone; insoluble in ether and petroleum ether; and slightly soluble in water.

Analysis: $C_{30}H_{34}O_5N_2 = 502.59$. Calculated: 71.69% C, 6.82% H, 5.57% N. Found: 71.4% C, 6.8% H, 5.4% N.

EXAMPLE 5

*Preparation of the dextrorotatory cinchonine salt of 1β - carboxy - 5β - hydroxy - 8 - keto - 1,4,4aα,5,8aα-hexahydronaphthalene in aqueous ethanol*

1 g. of dl-1β-carboxy-5β-hydroxy-8-keto-1,4,4aα,5,8,8aα-hexahydronaphthalene are dissolved in 4 cc. of boiling ethanol. 1.4 g. of cinchonine and, thereafter, 8 cc. of water of a temperature of 70° C. are added thereto. The mixture is allowed to cool while stirring and is cooled with ice. The crystals are filtered off, washed with water, and dried in a drying oven at 80° C. In this manner 1 g. of the cinchonine salt of dextrorotatory 1β - carboxy - 5β - hydroxy - 8 - keto - 1,4,4aα,5,8,8aα-hexahydronaphthalene is obtained which is similar in all respects to the compound obtained according to Example 4. The yield is 84% of the theoretical yield.

EXAMPLE 6

*Decomposition of the cinchonine salt of dextrorotatory 1β - carboxy - 5β - hydroxy - 8 - keto - 1,4,4aα,5,8aα-hexahydronaphthalene*

940 mg. of the cinchonine salt of dextrorotatory 1β-carboxy - 5β - hydroxy - 8 - keto - 1,4,4aα,5,8,8aα - hexahydronaphthalene obtained according to Example 4 or 5 are suspended in 4 cc. of water. 1 cc. of 20% ammonia solution is added thereto. The mixture is stirred. The precipitated cinchonine is filtered off and is washed with water. On drying 0.5 g. thereof are recovered. The recovery yield is 90%.

The remaining solution is acidified by the addition of concentrated hydrochloric acid (22° Bé.) to a pH of 1.0. The acidified solution is concentrated in a vacuum to a volume of 2 cc. and is saturated with sodium chloride. The precipitate is filtered off, redissolved in 10 cc. of acetone and filtered. 20 cc. of ether are added to the acetone solution which is then concentrated to a volume of 3 cc. The resulting crystals are filtered off and dried. 330 mg. of pure dextrorotatory 1β-carboxy-5β-hydroxy-8 - keto - 1,4,4aα,5,8,8aα - hexahydronaphthalene are obtained. The yield is 66% of the theoretical yield. Said dextrorotatory compound melts instantaneously at 210° C. with decomposition. Its optical rotation is $$[\alpha]_D^{20} = +83° \pm 4°$$

(concentration: 0.5% in ethanol). It is in all its characteristic properties identical with a product obtained according to Example 2.

EXAMPLE 7

*Preparation of the ephedrine salt of the dextrorotatory 1β - carboxy - 5β - hydroxy - 8 - keto - 1,4,4aα,5,8,8aα-hexahydronaphthalene*

100 g. of 1β-carboxy-5β-hydroxy-8-keto-1,4,4aα,5,8,8aα-hexahydronaphthalene are dissolved in 500 cc. of absolute ethanol while boiling. The solution is cooled to 50° C. 108 cc. of a water-free solution of 71.5% of levo-ephedrine in ethanol are added thereto rapidly. The resulting mixture is cooled to +5° C. and is allowed to stand at said temperature for 2 hours. The precipitated crystals are filtered off and dried in a vacuum. 67.5 g. of the ephedrine salt of the dextrorotatory 1β - carboxy - 5β - hydroxy - 8 - keto - 1,4,4aα,5,8,8aα-hexahydronaphthalene of the melting point 153° C. and the optical rotation $[\alpha]_D^{20} = +30° \pm 1°$ (concentration: 5% in water) are obtained. The yield is 75% of the theoretical yield. The resulting new product is obtained in the form of fine colorless needles.

EXAMPLE 8

*Decomposition of the ephedrine salt of the dextrorotatory 1β - carboxy - 5β - hyroxy - 8 - keto - 1,4,4aα,5,8,8aα-hexahydronaphthalene*

67.5 g. of the ephedrine salt of the dextrorotatory 1β-carboxy - 5β - hydroxy - 8 - keto - 1,4,4aα,5,8,8aα-hexahydronaphthalene obtained according to Example 7 are suspended in 250 cc. of acetone. 16 cc. of concentrated hydrochloric acid are added thereto at 20° C. while stirring. The mixture is stirred at room temperature for 15 minutes. The hydrochloride of levo-ephedrine set free thereby is filtered off. The filtrate is evaporated to dryness in a vacuum. The resulting residue is made into the paste 5 times with water, each time with 10 cc. of water, and is dried in a vacuum at 80° C. 34.4 g. of pure dextrorotatory 1β-carboxy-5β-hydroxy-8-keto-1,4,4aα,5,8,8aα-hexahydronaphthalene are obtained. The yield is 92% of the theoretical yield. The compound melts instantaneously at 210° C. with decomposition. Its optical rotation is $[\alpha]_D^{20} = +83° \pm 4°$ (concentration: 0.5% in ethanol). It is in all its properties identical with the product obtained according to Example 2.

EXAMPLE 9

*Preparation of the levorotatory lactone of 5β-hydroxy-8 - oxo- 1,4,4aα,5,8,8aα - hexahydronaphthalene-1β-carboxylic acid (Formula II)*

8 g. of the dextrorotatory 5β-hydroxy-8-oxo-1,4,4aα,5,8,8aα-hexahydronaphthalene-1β-carboxylic acid prepared according to Example 6 and 4 g. of pulverized sodium acetate are introduced into a mixture of 200 cc. of methylene chloride and 16 cc. of acetic acid anhydride. The mixture is heated under reflux for 2 hours and is then cooled. 16 cc. of pyridine and 16 cc. of methanol are added thereto. The resulting mixture is allowed to stand at room temperature for one hour and is acidified by the addition of 2 N hydrochloric acid to a pH of 1.0. The solvent layer is separated, washed with water and sodium bicarbonate solution, dried over magnesium sulfate, and evaporated to dryness in a vacuum. The residue is dissolved in 30 cc. of ether, heated under reflux, and cooled with ice. The precipitate is filtered off and is washed with ether. 6.1 g. of the levorotatory lactone of 5β-hydroxy-8-oxo-1,4,4aα,5,8,8aα-hexahydronaphthalene-1β-carboxylic acid of Formula II are obtained. The yield is 83% of the theoretical yield. The melting point is 108° C. The optical rotation is $[\alpha]_D^{20} = -790° \pm 20°$ (concentration: 0.5% in ethanol). The compound, which has not been described heretofore, is obtained in the form of colorless crystals which are soluble in acetone and chloroform and very little soluble in ether.

Analysis: $C_{11}H_{10}O_3 = 190.19$. Calculated: 69.46% C, 5.30% H, 25.24% O. Found: 68.8% C, 5.6% H, 24.8% O.

EXAMPLE 10

*Preparation of the dextrorotatory lactone of 8β-hydroxy-2α - bromo - 3β,5β, - epoxy - 1,2,3,4,4aα,5,8,8aα - octahydronaphthalene-1β-carboxylic acid (Formula III)*

(a) *Preparation of the levorotatory 1,8-lactone of 5β,8β - dihydroxy - 1,4,4aα,5,8,8aα - hexahydronaphthalene-1β-carboxylic acid.*—40 g. of molten aluminum isopropylate and 500 cc. of anhydrous isopropanol are mixed. A few drops of the mixture are distilled off and 20 g. of the levorotatory lactone of 5β-hydroxy-8-oxo-1,4,4aα,5,8,8aα-hexahydronaphthalene-1β-carboxylic acid of Formula II, prepared according to Example 9, are added thereto. The reaction mixture is concentrated by distallation to a volume of 100 cc. and is cooled. 300 cc. of methylene chloride are added thereto. The solution is washed with N sulfuric acid and with water, dried over magnesium sulfate, and evaporated to dryness. The residue is dissolved in 50 cc. of ice-cold ether. The precipitated crystals are filtered off. 17.1 g. of the levorotatory 1,8-lactone of 5β,8β-dihydroxy-1,4,4aα,5,8,8aα-hexahydronaphthalene-1β-carboxylic acid are obtained thereby. The yield is about 85% of the theoretical yield. Its melting point is 151° C.; its optical rotation is $$[\alpha]_D^{20} = -3°$$

(concentration: 0.5% in ethanol). The product, which heretofore has not been described, is obtained in the form of colorless crystals which are soluble in ethanol and chloroform and very little soluble in ether.

Analysis: $C_{11}H_{12}O_3=192.21$. Calculated: 68.73% C, 6.29% H, 24.97% O. Found: 68.8% C, 6.1% H, 25.2% O.

(b) *Preparation of the dextrorotatory lactone of 8β-hydroxy - 2α - bromo - 3β,5β - epoxy - 1,2,3,4,4aα,5,8,8aα - octahydronaphthalene - 1β - carboxylic acid (Formula III).*—11.5 g. of the levorotatory 1,8-lactone of 5β,8β - dihydroxy - 1,4,4aα,5,8,8aα - hexahydronaphthalene-1β-carboxylic acid prepared according to Example 10a are introduced into 55 cc. of tertiary butanol. The mixture is stirred at 25° C. for 5 minutes. 10.8 g. of N-bromosuccinimide are added thereto in small portions while stirring is continued. The mixture is stirred for 15 minutes, 110 cc. of water are added thereto drop by drop, and stirring is continued for 15 more minutes. The precipitate is filtered off, washed with 20 cc. of water, and dried at 70° C. in an oven. Thereby 13.7 g. of the dextrorotatory lactone of 8β-hydroxy-2α-bromo-3β,5β-epoxy-1,2,3,4,4aα,5,8,8aα - octahydronaphthalene - 1β - carboxylic acid of Formula IV are obtained. The yield is 85% of the theoretical yield. The melting point of said acid is 152° C.; its optical rotation is $[\alpha]_D^{20}=+93°$ (concentration: 0.5% in ethanol). The new product is obtained in the form of colorless crystals which are soluble in acetone and chloroform but very little soluble in ether.

Analysis: $C_{11}H_{11}O_3Br=271.12$. Calculated: 48.73% C, 4.09% H, 17.70% O, 29.48% Br. Found: 48.7% C, 4.3% H, 17.8% O, 29.6% Br.

EXAMPLE 11

*Preparation of 18β-hydroxy-11,17α-dimethoxy-3-oxo-16β-carboxy-2,3-seco-20α-yohimbane (Formula V)*

(a) *Preparation of the dextrorotatory lactone of 8β-hydroxy - 2α - methoxy - 3β,5β - epoxy - 1,2,3,4,4aα,5,8,8aα - octahydronaphthalene - 1β - carboxylic acid.*— 11 g. of the dextrorotatory lactone of 8β-hydroxy-2α-bromo - 3β,5β-epoxy - 1,2,3,4,4aα,5,8,8aα - octahydronaphthalene-1β-carboxylic acid of Formula III, prepared according to Example 10b, are made into a paste by mixing with 25 cc. of methanol. The paste is diluted with 55 cc. of methanol. 19.9 cc. of a solution of 5 g. of sodium metal in 100 cc. of methanol are then added thereto. The reaction mixture is allowed to stand at a temperature of 20° C. for three hours. Ten drops of glacial acetic acid are added thereto and the mixture is evaporated to dryness in a vacuum. The residue is dissolved in 1000 cc. of ether. The solution is filtered, concentrated by evaporation to a volume of 50 cc., and cooled with ice. The precipitated crystals are filtered off. 8.38 g. of the dextrorotatory lactone of 8β-hydroxy-2α-methoxy-3β,5β-epoxy - 1,2,3,4,4aα,5,8,8aα, - octahydronaphthalene - 1β-carboxylic acid are obtained. Melting point: 102° C.; optical rotation $[\alpha]_D^{20}=+48°\pm3°$ (concentration: 0.5% in ethanol). The yield is 92% of the theoretical yield. The new compound is obtained in the form of colorless crystals which are soluble in acetone and chloroform and very slightly soluble in ether.

Analysis: $C_{12}H_{14}O_4=222.23$. Calculated: 64.85% C, 6.35% H, 28.80% O. Found: 64.8% C, 6.5% H, 28.3% O.

(b) *Preparation of the levorotatory 1,8-lactone of 6α-bromo - 7β,8β - dihydroxy - 2α - methoxy - 3β,5β - epoxy-4aα,8aα - decahydronaphthalene - 1β - carboxylic acid.*— 8.38 g. of the dextrorotatory lactone of 8β-hydroxy-2α-methoxy - 3β,5β - epoxy - 1,2,3,4,4aα,5,8,8aα - octahydronaphthalene-1β-carboxylic acid obtained according to Example 11a are introduced into 75 cc. of water. 15 cc. of N sulfuric acid and then 7.55 g. of N-bromo succinimide are added thereto. The reaction mixture is heated to 50° C. for about 30 minutes. After cooling, the precipitate is filtered off and dried in a vacuum. Thereby, 9.25 g. of the levorotatory 1,8-lactone of 6α-bromo-7β,8β - dihydroxy - 2α - methoxy - 3β,5β - epoxy - 4aα, 8aα-decahydronaphthalene-1β-carboxylic acid are obtained. The yield is 79% of the theoretical yield. The melting point of the compound is 203° C., its optical rotation is $[\alpha]_D^{20}=-120°\pm3°$ (concentration: 0.5% in ethanol). The new product is obtained in the form of colorless crystals which are soluble in acetone and chloroform and very little soluble in ether.

Analysis: $C_{12}H_{15}O_5Br=319.16$. Calculated: 45.16% C, 4.74% H, 25.06% O, 25.04% Br. Found: 45.0% C, 4.9% H, 25.0% O, 25.0% Br.

(c) *Preparation of the levorotatory lactone of 6α-bromo-8β-hydroxy-2α-methoxy-3β,5β-epoxy-7-oxo - 4aα, 8aα-decahydronaphthalene-1β-carboxylic acid.*—8.48 g. of the levorotatory 1,8-lactone of 6α-bromo-7β,8β-dihydroxy-2α-methoxy-3β,5β-epoxy-4aα,8aα - decahydronaphthalene-1β-carboxylic acid obtained according to Example 11b are added to 25 cc. of acetic acid. 31 cc. of a solution of 11.3% of chromic acid in acetic acid are added to said mixture drop by drop without agitation. The temperature during said addition is maintained between about +5° C. and +10° C. The mixture is allowed to stand at room temperature for 3 hours and is stirred thereby from time to time. 12 cc. of methanol are added thereto. The mixture is stirred for one hour. 50 cc. of water are then added, and the reaction mixture is extracted three times with chloroform. The extracts are combined, washed with water, dried over magnesium sulfate, and evaporated to dryness in a vacuum. The residue is dissolved with ether, filtered, and dried. 8.2 g. of the levorotatory lactone of 6α-bromo-8β-hydroxy-2α-methoxy-3β,5β-epoxy - 7 - oxo-4aα,8aα-decahydronaphthalene-1β-carboxylic acid are obtained. The yield is 74% of the theoretical yield. The melting point of said compound is 152° C.; its optical rotation is $[\alpha]_D^{20}=-231°\pm3°$ (concentration: 0.5% in ethanol). The resulting product which has not been described heretofore is obtained in the form of colorless crystals which are soluble in acetone and chloroform and are almost insoluble in ether.

Analysis: $C_{12}H_{13}O_5Br=317.14$. Calculated: 45.44% C, 4.13% H, 25.22% O, 25.20% Br. Found: 45.9% C, 4.2% H, 25.5% O, 24.8% Br.

(d) *Preparation of the levorotatory 3β-hydroxy-2α-methoxy-7-oxo - 1,2,3,4,4aα,7,8,8aα - octahydronaphthalene-1β-carboxylic acid.*—3.88 g. of the levorotatory lactone of 6α-bromo-8β-hydroxy-2α-methoxy-3β,5β-epoxy-7-oxo-4aα,8aα-decahydronaphthalene-1β - carboxylic acid obtained according to Example 11c are dissolved in a mixture of 70 cc. of acetone and 8 cc. of acetic acid. The solution is cooled to a temperature of about +5° C. and 15.5 g. of zinc powder are added thereto. The mixture is stirred for several minutes whereby the temperature is maintained at +15° C., filtered, and the filtrate is evaporated to dryness in a vacuum. The residue is dissolved in chloroform containing 20% of ethanol. 8 cc. of water are added thereto. The mixture is acidified by the addition of 7 N sulfuric acid to a pH of 1.0 and is extracted with chloroform containing 20% of ethanol. The chloroform extracts are combined, dried over magnesium sulfate, and evaporated to dryness in a vacuum. The residue is dissolved in a mixture of acetone and ether (2:3). On cooling with ice, crystals are obtained which are filtered off and dried at 80° C. The levorotatory 3β-hydroxy-2α-methoxy-7-oxo-1,2,3,4,4aα,7,8,8aα - octahydronaphthalene-1β-carboxylic acid is obtained thereby in a yield of about 82%. The melting point of said acid is 197° C.; its optical rotation is $[\alpha]_D^{20} = -170° \pm 5°$ (concentration: 0.5% in ethanol). The new compound is obtained in the form of small colorless prismatic crystals which are soluble in water, alcohol, and acetone, but very little soluble in ether, and insoluble in chloroform.

Analysis: $C_{12}H_{16}O_5 = 240.25$. Calculated: 59.99% C, 6.71% H, 33.30% O. Found: 60.2% C, 6.7% H, 33.7% O.

(e) *Preparation of the levorotatory methyl ester of 3β-hydroxy - 2α - methoxy-7-oxo-1,2,3,4,4aα,7,8,8aα-octahydronaphthalene-1β-carboxylic acid.*—4.2 g. of 3β-hydroxy - 2α - methoxy-7-oxo-1,2,3,4,4aα,7,8,8aα-octahydronaphthalene-1β-carboxylic acid obtained according to Example 11d are dissolved in 160 cc. of dioxane while heating. The solution is cooled to 10° C. A solution of diazomethane in methylene chloride is added thereto until the color of the solution remains yellow. The mixture is allowed to stand at room temperature for 5 minutes and is then evaporated to dryness in a vacuum. 50 cc. of ether are added to the residue whereby crystallization takes place. After filtering and drying the crystals, the levorotatory methyl ester of 3β-hydroxy-2α-methoxy-7-oxo-1,2,3,4,4aα,7,8,8aα-octahydronaphthalene - 1β - carboxylic acid is obtained with a yield of 95%. Said ester which has not been described heretofore is obtained in the form of small colorless crystals which are soluble in alcohol, acetone, and chloroform, but are almost insoluble in ether. Its melting point is 166° C.; its optical rotation is $[\alpha]_D^{20} = -170° \pm 5°$ (concentration: 0.5% in ethanol).

Analysis: $C_{13}H_{18}O_5 = 254.27$. Calculated: 61.40% C, 7.14% H, 31.46% O. Found: 61.4% C, 7.1% H, 31.7% O.

(f) *Preparation of the levorotatory methyl ester of 3β-acetoxy-2α-methoxy-7-oxo - 1,2,3,4,4aα,7,8,8aα - octahydronaphthalene-1β-carboxylic acid.*—3.2 g. of the levorotatory methyl ester of 3β - hydroxy - 2α - methoxy - 7 - oxo-1,2,3,4,4aα,7,8,8aα-octahydronaphthalene - 1β - carboxylic acid obtained according to Example 10e are introduced into 12 cc. of pyridine. 10 cc. of acetic acid anhydride are added thereto. The mixture is allowed to stand at room temperature overnight. Water is added thereto and the mixture is extracted with chloroform. The chloroform extracts are washed with 2 N hydrochloric acid, salt-containing water, and sodium bicarbonate solution, dried over magnesium sulfate, and evaporated to dryness in a vacuum. The residue is dissolved in ether. Di-isopropyl ether is added to the ethereal solution until the resulting turbidity persists. The precipitated levorotatory methyl ester of 3β-acetoxy-2α-methoxy-7-oxo-1,2,3,4,4aα,7,8,8aα-octahydronaphthalene - 1β-carboxylic acid is filtered off. Its melting point is 96° C.; its optical rotation is $[\alpha]_D^{20} = -206° \pm 5°$ (concentration: 0.5% in ethanol). The yield is 90% of the theoretical yield. The new compound is obtained in the form of colorless crystals which are soluble in alcohol, acetone, and chloroform and are only slightly soluble in ether.

Analysis: $C_{15}H_{20}O_6 = 296.31$. Calculated: 60.80% C, 6.80% H, 32.40% O. Found: 60.7% C, 6.8% H, 32.6% O.

(g) *Preparation of levorotatory 1β-carboxy methyl-2β-methoxy carbonyl-3α-methoxy-4β-acetoxy-6β-formyl cyclohexane in one reaction step.*—200 mg. of the levorotatory methyl ester of 3β-acetoxy-2α-methoxy-7-oxo-1,2,3,4,4aα,7,8,8aα-oxtahydronaphthalene-1β-carboxylic acid obtained as described in Example 11f are dissolved in 5 cc. of water-free acetic acid ethyl ester. After cooling, the mixture is ozonized at a temperature of —30° C. by allowing an ozonized oxygen current with an ozone content of 1% to pass through the solution at a rate of 0.2 l./min. for 1½ hours. As much of the dissolved ozone as possible is then removed from the solution by passing therethrough a current of nitrogen for about 5 minutes. The temperature of the solution is allowed to increase to room temperature. 2 cc. of water are added. The mixture is stirred for about 10 minutes and its acid component is extracted by stirring with a saturated aqueous solution of sodium bicarbonate. The aqueous layer is separated, acidified to a pH of 1.0, saturated with sodium chloride, and extracted with methylene chloride. The extract is evaporated to dryness after drying over magnesium sulfate. 128 mg. of the desired levoratatory aldehyde are obtained. The yield is about 60%. After trituration with a small amount of ether the aldehyde has a melting point of 165° C. Its optical rotation is $[\alpha]_D^{20} = -27° \pm 2°$ (concentration: 0.5% in ethanol).

When applying the same process steps to the corresponding racemic compound or to the dextrorotatory isomer there are obtained the respective racemic compound or the dextrorotatory isomer which has an optical rotation $[\alpha]_D^{20} = +26°$ (concentration: 0.5% in ethanol). The yields are about the same as those of the levorotatory aldehyde.

(h) *Preparation of the levorotatory methyl ester of 1β-carboxy methyl-2β-methoxy carbonyl-3α-methoxy-4β-acetoxy-6β-formyl cyclohexane.*—450 mg. of the levorotatory 1β-carboxy methyl-2β-methoxy carbonyl-3α-methoxy-4β-acetoxy-6β-formyl cyclohexane obtained according to the Example 11g are suspended at 0° C. in 15 cc. of ether. A solution of diazomethane in methylene chloride is added thereto until the color of the solution remains yellow. The reaction mixture is allowed to stand at 0° C. for five minutes and is then evaporated to dryness in a vacuum. The resulting residue forms a colorless gum which can directly be subjected to the following reaction steps:

(i) *Preparation of the condensation product of the levorotatory methyl ester of 1β-carboxy methyl-2β-methoxy carbonyl-3α-methoxy-4β-acetoxy-6β-formyl cyclohexane with 6-methoxy tryptamine.*—The colorless gum obtained according to Example 11h is dissolved in 3 cc. of benzene. A luke-warm solution of 284 mg. of 6-methoxy tryptamine in 18 cc. of benzene is added thereto. The mixture is allowed to stand at a temperature of 30° C. for 20 minutes and is evaporated to dryness in a vacuum. The resulting condensation product is also a colorless gum which can directly be subjected to the following reaction steps.

(j) *Preparation of dextrorotatory 18β-acetoxy-11,17α-dimethoxy - 3 - oxo - 16β-methoxy carbonyl-2,3-seco-20α-yohimbane.*—The colorless gum obtained according to Examples 11g, 11h, and 11i by starting with 1.408 g. of the levorotatory methyl ester of 3β-acetoxy-2α-methoxy-7-oxo-1,2,3,4,4aα, 7,8,8aα - octahydronaphthalene - 1β - carboxylic acid is dissolved in 47 cc. of methanol. 1.250 g. of sodium borohydride are added thereto. The mixture is heated under reflux for about 10 minutes and is concentrated by evaporation to a volume of 5 cc. 1 cc. of acetic acid are added thereto. The mixture is extracted with chloroform. The chloroform extracts are washed with 2 N hydrochloric acid, water, and sodium bicarbonate solution, and again with water. They are dried over magnesium sulfate and are evaporated to dryness in a vacuum. The residue is dissolved in a mixture of 4 cc. of pyridine and 3 cc. of acetic acid anhydride. The reaction mixture is allowed to stand at 40° C. for 10 minutes and is evaporated to dryness in a vacuum. The residue is dissolved in a mixture of acetic acid ethyl ester and ether (2:3). The solution is cooled with ice. The resulting crystals are filtered off. 1.2 g. of 18β-acetoxy-11, 17α-dimethoxy-3-oxo-16β-methoxy carbonyl-2,3-seco-20α-yohimbane in the dextrorotatory form are obtained. Its melting points are 162° C. and 184° C. after intermediate resolidification. Its optical rotation is $[\alpha]_D^{20} = +31° \pm 2°$ (concentration: 0.5% in ethanol). The yield is 60% of the theoretical yield. This product, which has not been described heretofore, is obtained in the form of colorless prismatic crystals which are soluble in acetone and chloroform and almost insoluble in ether.

Analysis: $C_{25}H_{32}O_7N_2 = 472.52$. Calculated: 63.54% C, 6.83% H, 23.70% O, 5.93% N. Found: 63.8% C, 6.7% H, 23.6% O, 6.0% N.

(k) *Preparation of 18β-hydroxy-11,17α-dimethoxy-3-oxo-16β-carboxy - 2,3 - seco - 20α - yohimbane (Formula V).*—4 g. of 18β-acetoxy-11,17α-dimethoxy-3-oxo-16β-methoxy carbonyl-2,3-seco-20α-yohimbane of the melting point of 184° C. and the optical rotation $[\alpha]_D^{20} = +31°$ (concentration: 0.5% in ethanol), are dissolved in a mixture of 84 cc. of absolute methanol, 24 cc. of water, and 12 cc. of 10 N sodium hydroxide solution. The mixture is boiled under reflux for about 1 hour, acidified by the addition of 10 N hydrochloric acid to a pH of 1.0, and concentrated by evaporation in a vacuum until it becomes turbid. It is then cooled with ice. The resulting precipitate is filtered off, washed with water, and dried. Thereby 3.11 g. of compound V are obtained in a yield of 89% of the theoretical yield. The compound is recrystallized from aqueous methanol. Its melting point is 150° C. and its optical rotation is $[\alpha]_D^{20} = +34°$ (concentration: 0.5% in ethanol). The compound is only very slightly soluble in water, but soluble in alkali hydroxide solution and in aqueous methanol.

Analysis: $C_{22}H_{28}O_6N_2 = 416.46$. Calculated: 63.44% C, 6.78% H, 23.05% O, 6.73% N. Found: 63.3% C, 6.80% H, 23.4% O, 6.8% N.

The compound has not yet been described in the literature.

The same process may also be applied to the levorotatory 18β - acetoxy-11,17α-dimethoxy-3-oxo-16β-methoxy carbonyl-2,3-seco-20α-yohimbane. Thereby the levorotatory compound V is also obtained. This compound of Formula V can readily be converted into the enantiomorphous isomer of natural reserpine as will be described hereinafter. The process can, of course, also be applied to the racemic mixture of 18β-acetoxy-11,17α-dimethoxy-3-oxo-16β-methoxy carbonyl-2,3-seco-20α-yohimbane.

EXAMPLE 12

*Preparation of the lactone of 18β-hydroxy-11,17α-dimethoxy - 3 - oxo - 16β - carboxy - 2,3 - seco - 20α-yohimbane (Formula VI)*

3 g. of the compound of Formula V obtained according to the process described in Example 11k are heated with 30 cc. of acetic acid anhydride, 30 cc. of acetic acid, and 1.5 g. lithium acetate in a stoppered container for 2 hours. The mixture is allowed to cool, water is added thereto, and the resulting mixture is allowed to crystallize. The crystals are filtered off, washed with water, and dried. 1.57 g. of the lactone of Formula VI are obtained thereby. The mother liquors remaining after filtering off the crystals are extracted with methylene chloride. The extract is washed with sodium hydroxide solution and with water. The washed extract is dried over magnesium sulfate and evaporated to dryness. After recrystallization of the residue from aqueous acetone, 610 mg. of the lactone of Formula VI are recovered so that the total yield in this step is 76%. The lactone of Formula VI forms colorless crystals of the melting point 175° C. and the optical rotation $[\alpha]_D^{20} = -83°$ (concentration: 0.25% in ethanol). The compound is soluble in chloroform, acetone, acetic acid ethyl ester, and is slightly soluble in alcohol.

Analysis: $C_{22}H_{26}O_5N_2 = 398.44$. Calculated: 66.31% C, 6.58% H, 20.08% O, 7.03% N. Found: 66.1% C, 6.7% H, 19.7% O, 6.8% N.

The lactone of Formula VI has not yet been described in the literature.

The same process can be applied to the enantiomorphous isomer of the compound of Formula V whereby the corresponding dextrorotatory lactone of Formula VI is obtained which melts at 175° C. and has an optical rotation $[\alpha]_D^{20} = +86°$ (concentration: 0.25% in ethanol). This compound also yields, as will be described hereinafter, the enantiomorphous isomer of natural reserpine.

The process can likewise be applied to the racemic compound of Formula V.

It is possible to effect the lactonization described hereinabove in the absence of acetic acid.

EXAMPLE 13

*Preparation of the lactone of reserpic acid (Formula VIII)*

2.6 g. of the levorotatory lactone of Formula VI obtained according to Example 12 are boiled under reflux with 90 cc. of phosphorus oxychloride for 2 hours. Excess phosphorus oxychloride is removed by distillation of the reaction mixture to dryness. The resulting residue which contains the quaternary base of Formula VII is dissolved in 180 cc. of acetic acid and the solution is heated under reflux after addition of 15 g. of zinc powder and 10 cc. of water. After boiling for 40 minutes, the mixture is cooled, zinc is filtered off and washed with acetone. The wash waters are combined with the acetic acid filtrate and the combined wash waters and filtrate are evaporated to dryness. The residue is dissolved in chloroform. The chloroform extracts are washed first with water and then with ammonia and are dried over magnesium sulfate. They are filtered and evaporated to dryness in a vacuum. After recrystallization from acetone 1.32 g. of the lactone of reserpic acid are obtained. The yield is 52%. The compound is identical with the compound obtained from natural reserpine and possesses the same characteristic properties as they are described in the literature.

When proceeding under the same reaction conditions and using the dextrorotatory enantiomorphous compound of Formula VI, the enantiomorphous lactone of reserpic acid is produced.

It is, of course, understood that the reduction can also be effected by means of an alkali metal borohydride. However, such a reduction method yields the lactone of iso-reserpic acid which must be isomerized to the reserpic acid by a treatment with pivalic acid according to methods known per se.

We claim:

1. The dextrorotatory in ethanol lactone of 8β-hydroxy-2α - bromo - 3β,5β - epoxy - 1,2,3,4,4aα,5,8,8aα - octahydronaphthalene-1β-carboxylic acid substantially free of its optical antipode.

2. The crystalline levorotatory in ethanol 1β-carboxy methyl-2β-methoxy carbonyl-3α-methoxy-4β-acetoxy-6β-formyl cyclohexane substantially free of its optical antipode, having a melting point of 165° C.

3. The process of producing the dextrorotatory in ethanol 1,8-lactone of 8β-hydroxy-2α-methoxy-3β,5β-epoxy - 1,2,3,4,4aα,5,8,8aα - octahydronaphthalene - 1β-carboxylic acid from dextrorotatory in ethanol 5β-hydroxy - 8 - oxo - 1,4,4aα,5,8,8aα - hexahydronaphthalene-1β-carboxylic acid which comprises the steps of (a) lactonizing said dextrorotatory 5β-hydroxy-8-oxo-1,4,4aα,5,8,8aα-hexahydronaphthalene-1β-carboxylic acid by heating under reflux with sodium acetate and acetic acid anhydride in methylene chloride;

(b) reducing the resulting levorotatory in ethanol lactone of 5β-hydroxy-8-oxo-1,4,4aα,5,8,8aα-hexahydronaphthalene-1α-carboxylic acid by means of aluminum isopropylate in isopropanol to the levorotatory in ethanol 1,8-lactone of 5β,8β-dihydroxy-1,4,4aα,5,8,8aα-hexahydronaphthalene-1β-carboxylic acid;

(c) reacting said 1,8-lactone with an amount of a brominating agent selected from the group consisting of an N-bromo imide, an N-bromo amide, and an N-bromo hydantoine sufficient to convert said lactone into the dextrorotatory in ethanol lactone of 8β-hydroxy-2α-bromo-3β,5β-epoxy-1,2,3,4,4aα,5,8,8aα-octahydronaphthalene-1β-carboxylic acid, said reaction being effected at room temperature in the presence of a solvent which is not affected by bromine;

(d) precipitating the resulting dextrorotatory lactone of 8β-hydroxy-2α-bromo-3β,5β-epoxy-1,2,3,4,4aα,5,8,8aα-octahydronaphthalene-1β-carboxylic acid by means of water;

(e) reacting said dextrorotatory lactone with sodium methylate in methanol; and (f) separating said dextrorotatory in ethanol 1,8-lactone of 8β-hydroxy-2α-methoxy-3β,5β-epoxy-1,2,3,4,4aα,-5,8,8aα-octahydronaphthalene-1β-carboxylic acid substantially free of its optical antipode.

4. A process of producing 1β-carboxy methyl-2β-methoxy carbonyl-3α-methoxy-4β-acetoxy-6β-formyl-cyclohexane which comprises the steps of dissolving the methyl ester of 3β-actoxy-2α-methoxy-7-oxo-1,2,3,4,4aα,-7,8,8aα-octahydronaphthalene-1β-carboxylic acid in an inert organic solvent, reacting said solution with ozone at temperatures between about 0° C. and about —60° C. for a time sufficient to effect ozonation, removing excess ozone, heating to room temperature and adding water to decompose the ozonide at room temperature and recovering 1β-carboxy methyl-2β-methoxy carbonyl-3α-methoxy-4β-acetoxy-6β-formyl-cyclohexane.

5. The process of producing dextrorotatory in ethanol 18β-acetoxy-11,17α-dimethoxy-3-oxo-16β-methoxy carbonyl-2,3-seco-20α-yohimbane from 5β-hydroxy-8-oxo-1,4,4aα,5,8,8aα-hexahydronaphthalene-1β-carboxylic acid and 6-methoxy-tryptamine, which comprises the steps of (a) resolving said racemic 5β-hydroxy-8-oxo-1,4,4aα,-5,8,8aα - hexahydronaphthalene - 1β - carboxylic acid by means of its salts with optically active bases, separating the salt of the levorotatory enantiomer and recovering dextrorotatory in ethanol 5β-hydroxy-8-oxo-1,4,4aα,5,8,-8aα-hexahydronaphthalene-1β-carboxylic acid substantially free of its optical antipode;

(b) lactonizing said dextrorotatory 5β-hydroxy-8-oxo-1,4,4aα,5,8,8aα-hexahydronaphthalene-1β-carboxylic acid by heating under reflux with sodium acetate and acetic acid anhydride in methylene chloride;

(c) reducing the resulting levorotatory in ethanol lactone of 5β-hydroxy-8-oxo-1,4,4aα,5,8,8aα-hexahydronaphthalene-1β-carboxylic acid by means of aluminum isopropylate in isopropanol to the levorotatory in ethanol 1,8-lactone of 5β,8β-dihydroxy-1,4,4aα,5,8,8aα-hexahydronaphthalene-1β-carboxylic acid;

(d) reacting said 1,8-lactone with an amount of a brominating agent selected from the group consisting of an N-bromo imide, an N-bromo amide, and an N-bromo hydantoine sufficient to convert said lactone into the dextrorotatory in ethanol lactone of 8β-hydroxy-2α-bromo-3β,5β-epoxy-1,2,3,4,4aα,5,8,8aα-octahydronaphthalene-1β-carboxylic acid, said reaction being effected at room temperature in the presence of a solvent which is not affected by bromine;

(e) precipitating the resulting dextrorotatory in ethanol lactone of 8β-hydroxy-2α-bromo-3β,5β-epoxy-1,2,3,4,-4aα,5,8,8aα-octahydronaphthalene-1β-carboxylic acid by means of water;

(f) reacting said dextrorotatory lactone with sodium methylate in methanol;

(g) brominating the resulting dextrorotatory in ethanol lactone of 8β-hydroxy-2α-methoxy-3β,5β-epoxy-1,2,-3,4,4aα,5,8,8aα-octahydronaphthalene-1β-carboxylic acid by the action of a brominating agent in an inert solvent;

(h) oxidizing the resulting levorotatory in ethanol 1,8-lactone of 6α-bromo-7β,8β-dihydroxy-2α-methoxy-3β,5β-epoxy-4aα,8aα-decahydronaphthalene-1β-carboxylic acid by the action of an oxidizing agent in an acidic medium;

(i) reducing the resulting levorotatory in ethanol lactone of 6α-bromo-8β-hydroxy-2α-methoxy-3β,5β-epoxy-7-oxo-4aα,8aα-decahydronaphthalene-1β-carboxylic acid by the action of zinc in an acidific solvent;

(j) methylating the resulting levorotatory in ethanol 3β - hydroxy - 2α - methoxy - 7 - oxo - 1,2,3,4,4aα,7,8,-8aα-octahydronaphthalene-1β-carboxylic acid by the action of diazomethane;

(k) acetylating the resulting levorotatory in ethanol methyl ester of 3β-hydroxy-2α-methoxy-7-oxo-1,2,3,4,-4aα,7,8,8aα-octahydronaphthalene-1β-carboxylic acid by the action of an acetlyating agent;

(l) reacting levorotatory in ethanol methyl ester of 3β - acetoxy - 2α - methoxy - 7 - oxo - 1,2,3,4,4aα,7,8,8aα-octahydronaphthalene-1β-carboxylic acid with ozone in solution in an organic solvent at temperatures between about 0° C. and about —60° C. for a time sufficient to effect ozonation;

(m) removing excess ozone from the reaction mixture;

(n) decomposing the ozonide formed at room temperature with water; and (o) converting the resulting levorotatory in ethanol 1β-carboxy methyl-2β-methoxy carbonyl-3α-methoxy-4β-acetoxy-6β-formyl-cyclohexane to said dextrorotatory in ethanol 18β-acetoxy-11,17α-dimethoxy-3-oxo-16β-methoxy carbonyl-2,3-seco-20α-yohimbane by esterification, reaction with 6-methoxy-tryptamine and reduction.

References Cited in the file of this patent
UNITED STATES PATENTS

| | | |
|---|---|---|
| 2,883,384 | Woodward | Apr. 21, 1959 |
| 2,901,483 | Kuehne | Aug. 25, 1959 |

OTHER REFERENCES

Long: Chem. Reviews, vol. 27 (1940), pp. 459-462.

Woodward: Journ. Am. Chem. Soc., vol. 78, pp. 2023-2025 and 2657 (May 5, 1956).

Karrer: Org. Chemistry, 2nd ed., Elsevier, N.Y. (1946), pp. 98 and 99.

UNITED STATES PATENT OFFICE
CERTIFICATION OF CORRECTION

Patent No. 2,952,682                                    September 13, 1960

Georges Muller et al.

It is hereby certified that error appears in the above numbered patent requiring correction and that the said Letters Patent should read as corrected below.

Column 2, lines 4 to 11, the formula should appear as shown below instead of as in the patent:

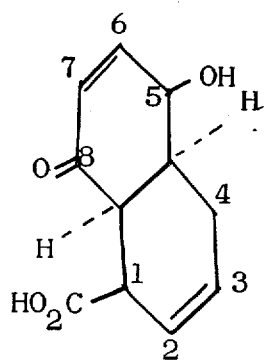

column 9, line 39, for "in" read -- In --; line 48, for "8aα" read -- 8,8aα --; column 10, line 24, for "hyroxy" read -- hydroxy --; column 11, line 17, for "distallation" read -- distillation --; column 17, line 12, for "α" read -- β --; column 18, line 30, for "acidific" read -- acidic --; line 38, for "acetlyating" read -- acetylating --.

Signed and sealed this 13th day of June 1961.

(SEAL)
Attest:

ERNEST W. SWIDER                              DAVID L. LADD

Attesting Officer                             Commissioner of Patents